G. T. Chapman,
Harness Reins,

N°. 59965. Patented Nov. 27, 1866.

Witnesses
S. C. Conboye
Edw. F. Brown

Inventor
Geo. T. Chapman

United States Patent Office.

IMPROVED REINS FOR HORSES.

GEORGE T. CHAPMAN, OF NEW YORK.

Letters Patent No. 59,965, dated November 27, 1866.

SPECIFICATION.

TO ALL WHOM IT MAY CONCERN:

Be it known that I, GEORGE T. CHAPMAN, of New York city, in the State of New York, have invented a new and useful improvement in the Driving or Guiding Reins for Horses; and I do hereby declare that the following is a full and exact description thereof, reference being had to the accompanying drawings, in which—

The nature of my invention consists in attaching to the driving reins, near their connection with the bit of a horse's bridle, elastic springs, of rubber or other suitable material, of sufficient resistance to guide the animal when under proper control of the driver, and in connecting the said driving or guiding rein with the gag, curb, check, or other such reins, by means of auxiliary reins, so that when the animal becomes fractious and it is necessary to pull hard upon the bit, the springs will yield, whereby the strain is transferred from the driving rein to the said gag, curb, or check rein, thus giving the driver the desired control of the animal by means of one pair of reins.

To enable others skilled in the art to make and use my invention, I will proceed to describe its construction and operation.

Figure 1:
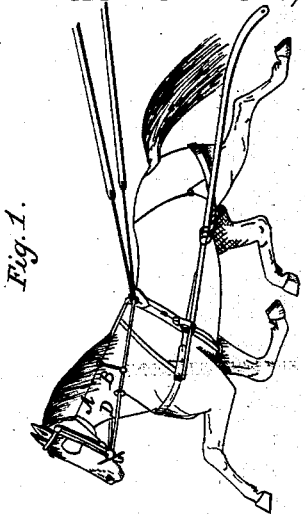
Figure 1 is a view of the reins when the animal is under proper control.
Figure 3:
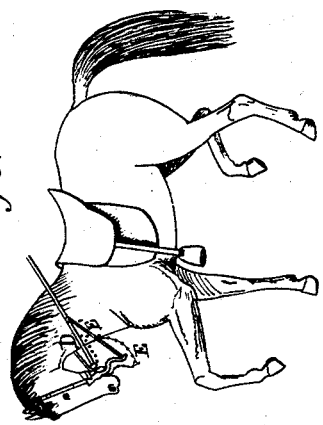
Figure 3 shows the reins connected to the curb reins.
Figure 2:
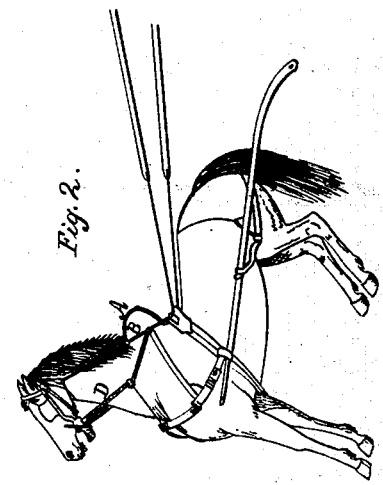
Figure 2 is a view of the same when the animal, having become fractious, sufficient strain has been applied to the lines as to transfer the strain to the check rein.

A, in the drawings, is the check or gag rein. B is an auxiliary rein. E is the curb rein, shown in dotted line in fig. 3. D is the spring or yielding attachment to the guiding rein, which is attached to the bit in the usual manner, and to the guiding rein by means of a ring or buckle, and forms a part of the said guiding rein. It is made of sufficient power of resistance to tensile strain to answer the purpose of a guiding rein when the animal is under the proper and ordinary control of the driver. The auxiliary reins are connected to the guiding rein at or in rear of the connection of the same with the elastic portion, and are of sufficient length to be in a slack condition when the springs are not extended by extra strain. $A'$, $B'$, $D'$, and $E'$, show the position of the same parts when, by reason of the animal having become fractious and resisting the control of the driver, he finds it necessary to increase the strain upon the rein until the springs are so far extended that the strain is transferred to the check, curb, or gag rein by the auxiliary rein, which is accomplished by the additional power applied to the reins by the driver, which so extends the elastic portion of the rein that the slack of the said gag, curb, or check rein, and their connections with the guiding rein, are drawn taut, the effect of which is to so draw upon the bit as to bring the fractious animal under control at once, as is well understood may be done by the curb, check, or gag reins, which are of the ordinary construction, and which it is not necessary to explain.

Having thus fully described my invention, what I claim, and desire to secure by Letters Patent, is—

I claim the combination of the elastic rein above described with the auxiliary reins and with the curb, gag, and check reins, as constructed and arranged for the purpose described and set forth.

GEO. T. CHAPMAN.

Witnesses:
 J. C. CONBOYE,
 EDM. F. BROWN.